United States Patent [19]

Jain

[11] 4,224,157
[45] Sep. 23, 1980

[54] PROCESS AND APPARATUS FOR SEPARATING SOLIDS FROM SUSPENSIONS OF INFLUENT

[75] Inventor: Kamlesh K. Jain, Phoenixville, Pa.
[73] Assignee: Fram Industrial Filter Corporation, Tulsa, Okla.
[21] Appl. No.: 21,276
[22] Filed: Mar. 16, 1979
[51] Int. Cl.$^2$ .............................................. B01D 21/01
[52] U.S. Cl. .................................. 210/208; 210/209; 210/219; 210/251; 210/519; 210/523
[58] Field of Search ..................... 210/49, 51, 59, 65, 210/70, 83, 84, 209, 219, 251, 512 R, 513, 519, 523, 208, 207

[56] References Cited
U.S. PATENT DOCUMENTS

| | | | |
|---|---|---|---|
| 2,602,465 | 7/1952 | Goehring | 210/519 |
| 3,353,679 | 11/1967 | Hirsch | 210/519 |

Primary Examiner—Frank Sever
Attorney, Agent, or Firm—Ken C. Decker

[57] ABSTRACT

An assembly for separating particulate matter from an influent carrier comprises a perforated plate for separating an inner compartment from an outer compartment, and for transferring the influent between the inner and outer compartment with a minimum amount of a convective momentum that is associated with disturbing the settling matter. In practicing the process, suspensions are introduced into the assembly at the inner compartment. An agitator subassembly, within the inner compartment, sequentially fast mixes and slow mixes the influent to respectively insure mixing of the influent with additives and to promote agglomeration of the suspensions. Flow paths in the perforated plate function to cancel all velocity components of the momentum, except for vertical downward acting velocity components, thereby maximizing the rate of settlementation.

6 Claims, 6 Drawing Figures

PROCESS AND APPARATUS FOR SEPARATING SOLIDS FROM SUSPENSIONS OF INFLUENT

BACKGROUND OF THE INVENTION

1. Field of the Invention

This invention pertains to a waste treatment system for separating particulate matters from an influent carrier, and more particularly pertains to a perforated plate for maintaining widely different hydrodynamic conditions in specific compartments of a separator assembly.

2. Description of the Prior Art

Many state of the art waste treatment systems for separating solids from a suspension generally operate in the following simplified version: An influent is received at either a top or lower section of a settling tank; a coagulant for promoting flocculation and agglomeration of the suspensions is added to the influent either before or after the influent enters the settling tank; the influent and coagulant are mixed to achieve agglomeration of the suspensions; heavy suspensions are caused to settle by either gravity and/or by a mechanical device; and lastly, clarified liquids and grease are caused to rise to the top of the separator where they are withdrawn, while settled solids are disposed of at a lower section of the tank.

However, a host of problems peculiar to the above described waste treatment systems and variations thereof have been continuously hampering the operation of state of the art systems. In some cases these problems have been difficult if not impossible to completely and satisfactorily resolve. For instance, state of the art systems are still coping with difficulties in controlling convective momentum, associated with flowing currents of influent, that interferes with both the downward settlementation of suspensions in the settling tank and the concentration of suspensions in a sludge disposal area of the tank. Likewise, it has also been extremely difficult to cause very small and/or microscopic suspensions to settle during the initial stages of separation, when the coagulant is first mixed with the influent, and during the latter stages of separation, when the clarified liquids are near the top area of the tank to be withdrawn. Similarly, the dual problem of first designing a mixing compartment to receive and mix a flocculant with the influent in order to cause agglomeration of the suspension, and second to efficiently transfer the suspensions that have become agglomerated from the mixing compartment to a settling compartment without breaking up the agglomerated suspensions, has yet to be satisfactorily solved.

Thus it is an object of this invention to provide a waste treatment assembly and process for controlling and directing convective momentum to maintain widely different hydrodynamic conditions in specific compartments of the assembly, by which the efficiency of the assembly and process are improved.

It is another object of this invention to provide a waste treatment assembly and process for directing convective momentum so that the rate of settlementation of the suspensions are improved.

It is still an object of this invention to provide a waste treatment assembly and process for transferring an influent suspension from a mixing compartment to a settling compartment without breaking up agglomerated suspensions.

It is yet another object of this invention to provide a waste treatment assembly and process for continuously decreasing convective momentum so that particles of increasingly smaller sizes are caused to settle.

It is also an object of this invention to provide a waste treatment assembly and process for continuously decreasing convective momentum during all of the process cycles involved in separating particles from liquids.

It is a further object of this invention to provide a waste treatment assembly and process that minimizes all velocity components of convective momentum except for the vertical components of velocity while transferring the influent from a mixing compartment to a settling compartment.

It is yet a further object of this invention to provide a waste treatment assembly and process for both rapidly and slowly mixing a chemical additive with an influent suspension to respectively insure mixing of the additive and the influent and to promote agglomeration of the particulate matter.

It is still a further object of this invention to provide a waste treatment assembly and process for controlling convective momentum so that the momentum does not interfere with: the settling of suspensions, the concentration of settled suspensions, and the removal of the settled suspensions.

SUMMARY OF THE INVENTION

A waste treatment assembly and process controls and directs convective momentum, associated with flowing currents of an influent suspension to provide quicker more efficient and less expensive separation of solids. The assembly further functions to maintain widely different hydrodynamic conditions in special compartments of the assembly, and functions to continuously separate solids carried by the influent. The basic components of the assembly are: an inner conical shaped mixing compartment, a perforated plate, and a cylindrical outer separator compartment.

The mixing compartment receives influent at an input near its top. A paddle within the mixing compartment of an agitator sub-assembly, first rapidly mixes a chemical coagulant additive to insure a thorough mixing of the coagulant and the influent. The paddle next slowly mixes the influent and coagulant to promote agglomeration of microflux. The conical shaped configuration of the mixing compartment aids in controlling the mixing rate as the influent moves down-stream to the settling compartment.

The perforated plate separates the mixing compartment from the settling compartment so as to maintain widely different hydrodynamic conditions in the mixing compartment and in the settling compartment. Flow paths within the plate enable the influent to be directed therefrom, and enable the influent to be transferred from the mixing compartment into the settling compartment without any abrupt variations in convective momentum during the transfer. The flow paths are orientated to eliminate all tangential velocity components of momentum while the influent passes through the flow paths to the settling compartment. Similarly all other velocity components of momentum, for instance axial components, are minimized by the flow paths except for the downward acting velocity components associated with currents flowing vertically downward in a direction of the transferred influent. Consequently, the rate of settlementation and concentration of suspensions therein is more rapidly and efficiently completed.

The settling compartment functions to settle out the solids transferred with the influent thereto, and functions to cause clarified liquids and grease to rise to the top of the settling compartment where the clarified liquids and grease are withdrawn. Concentrated suspension or sludge, settling out of the influent, is captured at the bottom of the settling compartment and is withdrawn.

In the conical annulus created by the inner walls of the settling compartment and the outer walls of the mixing compartment, particles of increasing smaller sizes settle out of the stream as the clarified liquid is displaced upwards in the separator compartment. Hence, the amount of solids caused to settle near and about the perforated plate is increased. Noteably, in view of the above, the assembly acts to continuously separate solids from the influent and continuously acts to minimize momentum during all stages of each process cycle. That is, from the moment the influent first enters the assembly to the time that clarified liquids and sedimentation or sludge is withdrawn from the assembly.

DETAILED DESCRIPTION OF THE INVENTION

Figure 1:
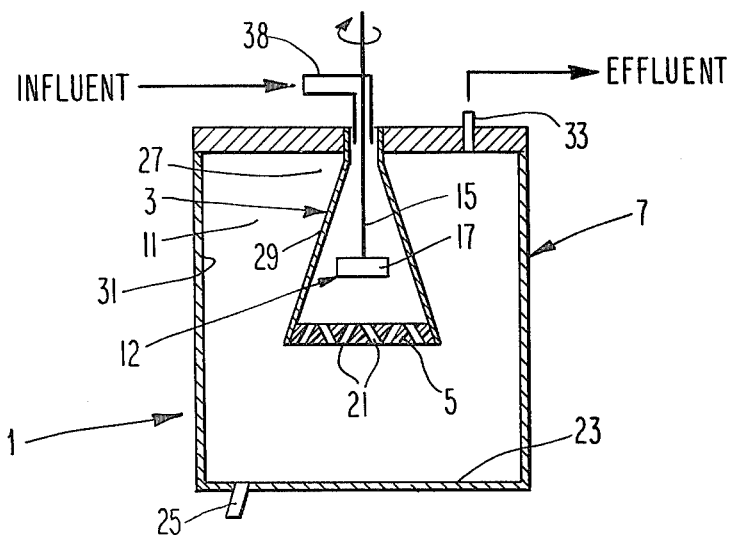
FIG. 1 is a front view of a waste treatment separator assembly made in accordance with this invention.

An improved, packaged, waste treatment separator, unit, assembly, system, generally designated as 1, of FIG. 1, is fundamentally a single or unit separator assembly for separating suspensions, particles, solids, grease, etc. from a liquid influent carrier. Assembly 1 may be divided for explanation purposes into the following three basic tanks, compartments, or sections: mixing compartment 3, perforated plate 5, and outer settling compartment 7. Assembly 1 (including perforated plate 5, inner mixing compartment 3 and outer settling compartment 7) are manufactured from state of the art materials typically utilized in the art of constructing separator units for waste treatment systems. The size of assembly 1 is principally determined by the specific type of waste treatment applications assembly 1 is designed to be employed in. Thus, assembly 1 may be of a variety of sizes. In a typical embodiment, assembly 1 can be approximately 16" or 400 millimeters high and can have a diameter of approximately 8.5" or 220 mm for a flow rate of approximately 5 gallons per hour or 300 cc per minute. These dimensions of course will vary depending on the flow rate of the stream to be treated.

Figures 4, 6:
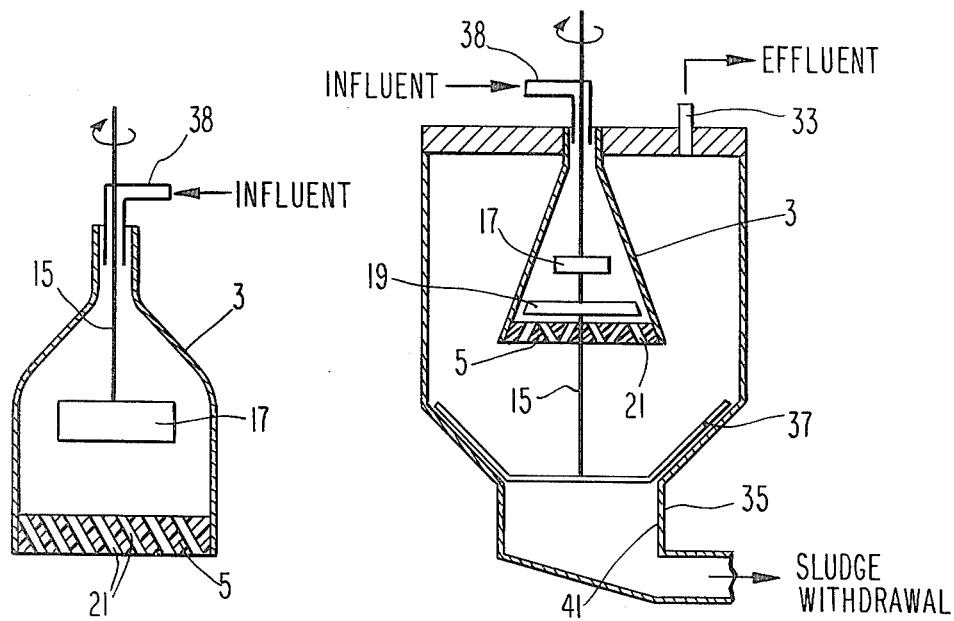
FIG. 4 is an alternate embodiment of the assembly of FIG. 1.
FIG. 6 is an alternate embodiment of the mixing compartment of FIG. 1.
Figure 5:
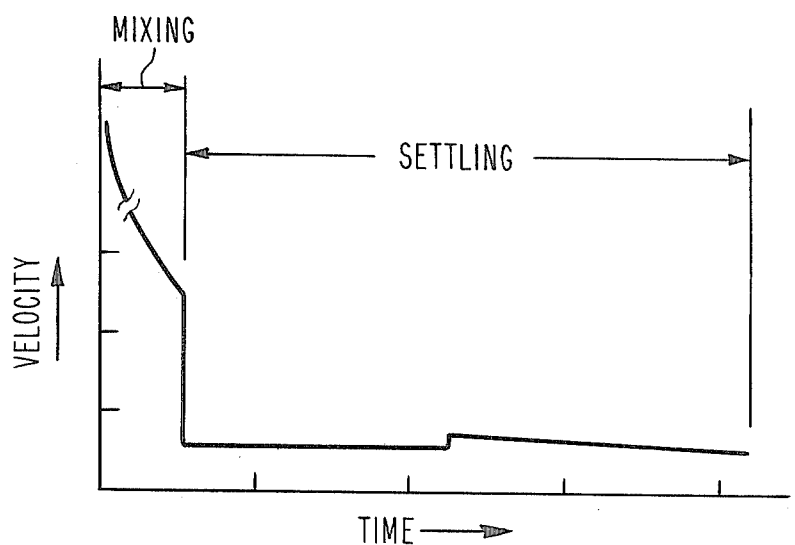
FIG. 5 is a qualitative velocity profile graph illustrating the physical characteristics for the velocity components of convective momentum.

Inner mixing compartment 3 is structured so that compartment 3 has an increasing area and volume configuration as shown in FIGS. 1 and 4 or yet have any number of other configurations that are structured to possess increasing area and volume. The increasing area and volume configuration of mixing compartment 3 helps in controlling the rate of mixing as the stream moves downwards within the confines of compartment 3. Compartment 3 is centrally located within an upper area or zone 11 of outer settling compartment 7 and is connected thereto by conventional attachment methods. The diameter of compartment 3 at or near its top and also at its base is not fixed, and is in essence determined by many variables, such as: the kind of waste that is processed, the input velocity of the influent, and the desired rate of settlementation. In the previous example given for assembly 1, compartment 3 will have in base diameter of approximately 5" or 127 mm, a height of approximately 8" or 203 mm, and an upper diameter of approximately 1" or 25 mm.

Compartment 3 includes an agitator subassembly, generally designated as 12, for mixing chemical additives, such as commercially available flocculants and coagulants, with the influent. Agitator 12 further functions to promote agglomeration and coagulation of solids in the influent. Agitator 12 comprises a stirrer paddle 17, shaft 15 and a motor subassembly. Although the motor is not here illustrated, it is also of a kind normally employed in the waste treatment mixing tanks. Shaft 15 extends centrally downwards into inner compartment 3 and has the motor connected at its upper end typically outside of assembly 1. Stirrer 17 is connected at the lower end of shaft 15 through which stirrer 17 is driven at both high and low speeds.

Stirrer 17 extends to a depth within mixing compartment 3 that is sufficient to insure a thorough mixing of the chemicals and influent, and to promote flocculation, aggregation, or agglomeration of solids therein. The size of stirrer 17 is also a function of variables similar to those variables enumerated while discussing the size of assembly 1 and compartment 3. In the previous example given for assembly 1, stirrer 17 moves within a circular area having approximately a 3" or 76 mm diameter and 1" or 25 mm in height.

In an alternate embodiment of assembly 1, shown in FIG. 4, agitator 12 further includes a conventional scraper unit 19. Scraper unit 19 is attached to the lower end of shaft 15 below stirrer 17. Scraper 19 operates to prevent the hampering of influent flowing from inner mixing compartment 3 to settling compartment 7 by controlling or monitoring the amount or accumulation of sedimentation build up on perforated plate 5.

Figure 2:
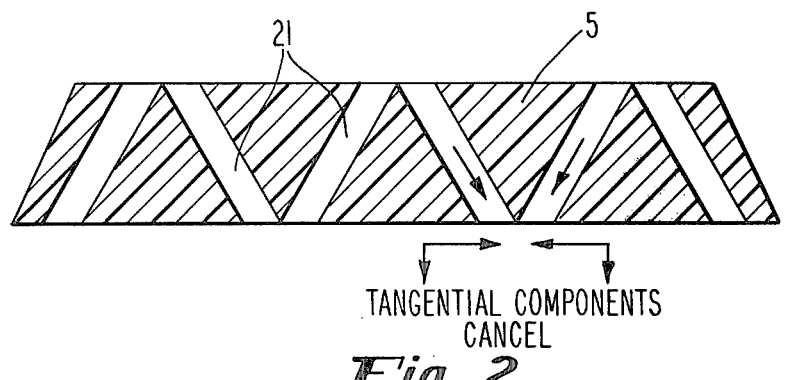
FIG. 2 is a detailed view of a perforated plate taken from FIG. 1.

Perforated plate 5 forms the base of mixing compartment 7 and also separates the inner mixing compartment 3 from the outer settling compartment, or said differently, plate 5 connects the two compartments 3 and 7 to each other. Additionally, perforated plate 5 acts to maintain widely different hydrodynamic conditions in compartments 3 and 7. Plate 5 generally has a disc configuration with an outer diameter large enough to fit the inner base diameter of compartment 3. Plate 5, as best illustrated in FIGS. 2 and 3, includes a plurality of spaced flow paths or holes 21 therein.

Flow paths 21, operate to direct and transport influent into compartment 7 from compartment 3. In the previous example given for assembly 1, flow paths 21 will have a diameter of ½" or 12.5 mm. Flow paths 21 are orientated or inclined within plate 5, so that tangential velocity components of convected momentum (which momentum is associated with flowing currents of influent) are cancelled and/or minimized.

For example, to accomplish minimization of tangential velocity momentum, a first certain number of paths 21 are orientated within plate 5 to form an angle of inclination of around 60° with respect to second or other certain remaining paths 21, and with respect to a horizontal reference position. The reference position is established by the base of plate 5 or compartment 3. Thus, when influent flows through paths 21, tangential components of velocity associated with various currents of influent flowing through the first certain number of paths 21, directly oppose tangential components of velocity associated with other currents of influent flowing through the remaining second number of paths 21. Consequently, the two opposing tangential components of velocity cancel or nullify one another. The only effective components of velocity associated with all currents flowing out of paths 21 are velocity components that act vertically downwards. Hence an improved rate of sedimentation occurs in compartment 7.

Figure 3:
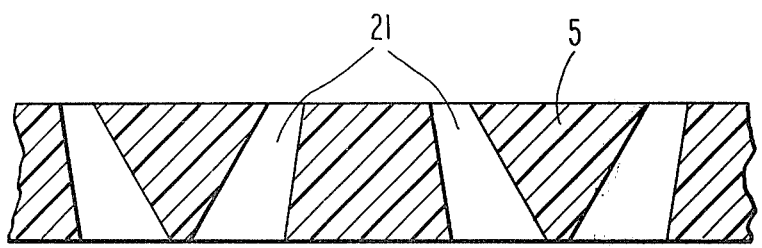
FIG. 3 is an alternate embodiment of the perforated plate of FIG. 2.

An alternate embodiment of plate 5 is shown in FIG. 3, wherein flow paths 21 are tapered so that the influent flows through a larger opening when it exits the plate than when it enters the plate. This results in reducing the momentum of the influent as it enters the lower section of outer compartment 7.

Outer compartment 7 includes a base area 23 wherein settled suspension or sludge is accumulated for withdrawal. Base area 23 is a flat circular area having an outlet for accumulating settled solids and having an outlet port 25 from which sludge is withdrawn.

An annulus 27 is formed in the area between outer walls 29 of inner compartment 3 and inner walls 31 of compartment 7. In the upper most reaches or areas of compartment 7, a second outward port 33 is positioned to enable removal of clarified liquids, grease, etc.

In an alternate embodiment of compartment 7, base area 23 is a conical shaped sludge collector 35, as depicted in FIG. 4. Additionally, the length of shaft 15 is extended so that a non annular blade shaped scraper plow 37 is attached thereto. Conical sludge compartment 35 operates to improve the rate of settlementation by providing additional surface on which small particles not yet settled in outer settling compartment 7 can be caused to settle, and by isolating settled solids in sludge compartment 35 from the flowing currents of the influent.

When practicing the process, influent is first fed into port 38. Chemical coagulant and/or flocculent additives are mixed with the influent either before the influent enters assembly 1 or just as the influent enters inner compartment 3. The influent and the additives are mixed by paddle 17.

In the preferred embodiment, the mixing speeds of paddle 17 is controlled so that mixing is accomplished in two stages. In the early stages, the influent and additives are rapidly mixed to create high turbulence, thereby insuring a thorough mixing of the influent and additives. In the latter stage, the influent and additives are slowly mixed to create tangential velocity components of sufficient magnitude to cause and promote agglomeration of solids, including the microflocs. Scraper unit 19, seen in FIG. 4, when applicable, stirs and aids accumulated suspensions that have settled on plate 5 to enter flow paths 21 and pass through to compartment 7.

In addition to the above, the increasing area and volume of compartment 3, during the mixing cycles causes momentum to be continuously decreased by slowing current flow as influent moves downwards in compartment 3, from which the magnitude of the tangential and axial components of velocity are decreased. Hence, coagulated and flocculated solids are made to settle out of the influent towards plate 5.

At plate 5, settled solids and influent are transported as streams of currents to outer settling compartment 7 through paths 21. Further, plate 5 as earlier mentioned, functions to maintain widely different hydrodynamic conditions in compartments 3 and 7, and also functions to isolate settling suspensions within compartment 7 from currents that tend to disintegrate the suspensions. And as described above, tangential components of velocity associated with the streams of currents leaving compartment 3 via path 21 of the plate 5 nullify one another. Furthermore, by using a single packaged unit, abrupt variations in momentum and velocities are avoided during the transfer of a suspension that would tend to break up agglomerated solids.

As a consequence of the above, the rate of sedimentation in compartment 7 is improved because the settling solids transferred thereto have only downward velocity and momentum while settling. Likewise, the possibility of disturbing solids that have settled out in compartment 7 with high input momentum of flowing currents fed into port 38 are eliminated by confining it to compartment 3. Similarly, the rate of concentration of accumulated sludge is also improved, the reason for this is that the possibility of disturbing accumulated solids with the input momentum of entering influent is eliminated or at least significantly minimized.

To continue, as the influent flows into compartment 7, solids acted on by forces of gravity, are induced to settle and accumulate at the bottom base area 23 of compartment 7. A greater efficiency of solids separation is achieved in this process because of separating the mixing and settling compartments, 3 and 7 respectively, and thereby reducing forces that may disturb sedimentation. After a desired amount of settled sludge is collected in base area 23, it is removed at exit port 25.

When sludge collector 35 and non annular blade shaped scraper plow 37 employed, plow 37 removes or directs settled sludge to collector 35. Interior walls 41 of conically configured sludge collector 35 provides additional area for accumulating settled sludge. Moreover, collector 35 tends to isolate the settled sludge from current flow and momentum. As a consequence of collector 35, in conjunction with the effect that walls 41 have on settling solids, the ability to concentrate collected sludge is improved.

Clarified liquids, grease and micro-flocs that are not either trapped into collector 35 or settled on base 23 rise to the top area 11 of outer compartment 7 from where they can be withdrawn. However, as the grease and micro-flocs rise upwards through conical annulus 27 mirco-flocs can separate by settling on the outside wall of the mixing compartment. This sedimentation of micro-flocs 27 happens because the velocity of the upward flowing currents is continuously reduced by the configuration of annulus 27.

In view of the many novel features incorporated within assembly 1, assembly 1 includes the following incomplete list of advantageous characteristics: The functions of particle agglomeration, solid sedimentation are combined in a single unit. When compared to conventional separators, a reduction by 30 to 50 percent in the total process time for separating solids from liquids is possible. An improved quality and amount of clarified liquid effluent is able to be withdrawn in a shorter time than heretofore acquired with state of the art separators. An increase in hydrodynamic stability characteristics for a continuous sedimentation process is possible. Convective momentum is continuously decreased and minimized during all process cycles or stages of separating. The ability to maintain widely different hydrodynamic conditions in inner and outer compartments 3 and 7 is now possible. Abrupt variations in velocity which tend to break up aggregated flocs during transference of a flocculated stream are avoided. Convective momentum that disrupts settled sludge is minimized, and settled sludge is isolated from the momentum of influent currents.

It is obvious that it is possible to produce still other embodiments of a solid separator and process for separating solids from an influent in accordance with the principles of this invention without departing from the scope of the inventive concept therein disclosed. Accordingly, it should be understood that all matter contained in the above description and in the accompanying drawings should be interpreted as illustrative and not in a limited sense.

What I claim as new and desire a United States Letters Patent for is:

1. Apparatus for separating suspended solids from a liquid comprising a mixing chamber, means in said mixing chamber for mixing said liquid to promote agglomeration of said suspended solids, a settling chamber in which said suspended solids settle from said liquid, and hydrodynamic means communicating said mixing chamber with said settling chamber for minimizing momentum transfer to the liquid in the settling chamber to thereby maximize the rate of sedimentation of the solids suspended in the liquid, said hydrodynamic means including a plate separating the mixing chamber from the settling chamber, said plate having perforations defining spaced flow paths through the plate, said flow paths being inclined with respect to the plane normal to the plane of the plate so that the liquid communicated through said flow paths has a tangential velocity component, said flow paths being dimensioned and positioned within said plate for cancelling the tangential velocity components of the liquid exiting said flow paths.

2. Apparatus for separating suspended solids from a liquid according to claim 1, wherein a first group of said flow paths are inclined within said plate in a direction different from the direction that the remaining group flow paths are inclined, the tangential velocity component introduced by each of said first group of flow paths being opposite in direction to the tangential velocity component introduced by each of the remaining group of said flow paths, whereby the tangential velocity components of the liquid passing through said first group of flow paths is canceled by the tangential velocity components of the liquid passing through the second group of flow paths.

3. Apparatus for separating suspended solids from a liquid according to claim 2, wherein said flow paths are tapered.

4. Apparatus for separating suspended solids from a liquid according to claim 2, wherein the angle defined between the flow paths in said first group and corresponding flow paths in the second group is substantially 60°.

5. Apparatus for separating suspended solids from a liquid according to claim 2, wherein said mixing chamber is disposed within said settling chamber, said mixing chamber having a fluid inlet at one end thereof and said plate providing an outlet at the other end thereof, said mixing chamber being tapered such that the transverse cross-sectional area of said mixing chamber is greater at the other end than at said one end and increases proportionately therebetween.

6. Apparatus for separating suspended solids from a liquid according to claim 5, wherein the outer surface of said mixing chamber cooperates with the inner surface of said settling chamber to define an annulus therebetween for causing the momentum of the liquid to decrease to permit solids of increasing smaller size to settle.

* * * * *